United States Patent

Barcomb

[11] Patent Number: 5,312,524
[45] Date of Patent: May 17, 1994

[54] DISTILLATION SYSTEM FOR RECOVERY OF INDUSTRIAL PROCESS LIQUIDS

[75] Inventor: Lyle B. Barcomb, North Syracuse, N.Y.

[73] Assignee: Filter Tech, Inc., Syracuse, N.Y.

[21] Appl. No.: 871,961

[22] Filed: Apr. 21, 1992

[51] Int. Cl.⁵ .............. B01D 3/02; B01D 3/10
[52] U.S. Cl. .............. 202/177; 159/24.2; 159/26.1; 159/46; 159/DIG. 16; 159/901; 196/134; 202/185.1; 202/205; 202/235; 202/237; 203/23; 203/27; 203/94; 203/98; 203/100; 203/DIG. 8; 203/DIG. 9
[58] Field of Search .............. 203/100, 94, 23, 27, 203/98, 24, DIG. 8, DIG. 9, 177, 205, 185.1, 235, 237; 159/24.3, 901, DIG. 1, 28.6, 46, 26.1, DIG. 16, 24.2; 165/172, 177; 122/412; 123/41.21; 196/110, 134, 140

[56] References Cited

U.S. PATENT DOCUMENTS

| | | | |
|---|---|---|---|
| 845,286 | 2/1907 | Witteman | 203/10 |
| 1,401,578 | 12/1921 | Blicken | 203/10 |
| 1,568,157 | 1/1926 | Hess | 203/22 |
| 1,892,654 | 12/1932 | Miller | 203/22 |
| 1,919,240 | 7/1933 | Miller | 203/22 |
| 2,280,093 | 4/1942 | Kleinschmidt | 203/10 |
| 2,389,064 | 11/1945 | Latham, Jr. | 203/10 |
| 2,637,684 | 5/1953 | Buffum | 203/22 |
| 3,607,670 | 9/1971 | King | 203/23 |
| 3,848,430 | 11/1974 | Porter et al. | 165/82 |
| 3,907,032 | 9/1975 | DeGroote et al. | 165/166 |
| 3,963,012 | 6/1976 | Harned | 165/152 |
| 4,032,412 | 6/1977 | Hoppe et al. | 203/22 |
| 4,233,153 | 11/1980 | Hammel et al. | 202/185.1 |
| 5,094,224 | 3/1992 | Diesch | 165/153 |

Primary Examiner—Virginia Manoharan
Attorney, Agent, or Firm—Charles S. McGuire

[57] ABSTRACT

A distillation system for recovery of volatile components of contaminated liquids used in an industrial process includes a tube assembly including outer tubes to which hot bottoms liquids are supplied and inner tubes to which process liquids are supplied for transfer of heat from the bottoms to the process liquids. From the tube assembly the two liquids are discharged into the still through separate, elongated, parallel discharge pipes. The process liquids discharge pipe is positioned above the bottoms liquids discharge pipe and an elongated, metal, angle plate is positioned as an inverted V between the two discharge pipes. Efficiency is improved over prior systems wherein process liquids are added to the still without being preheated by the bottoms fluids, and without the unique still intake manifold.

15 Claims, 2 Drawing Sheets

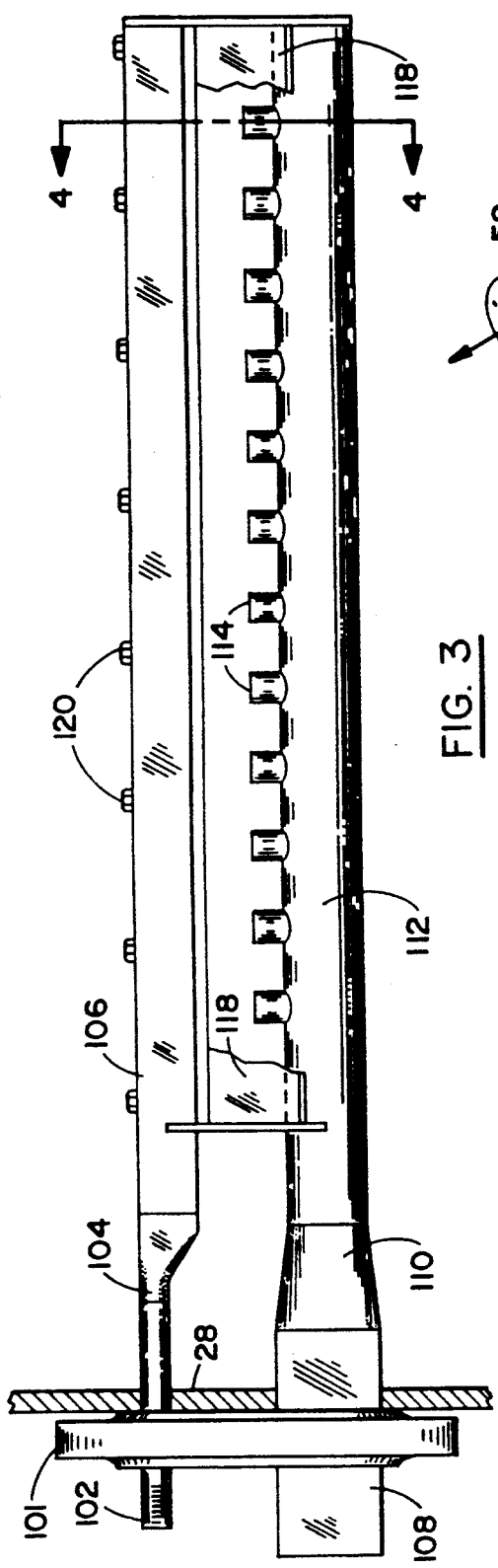
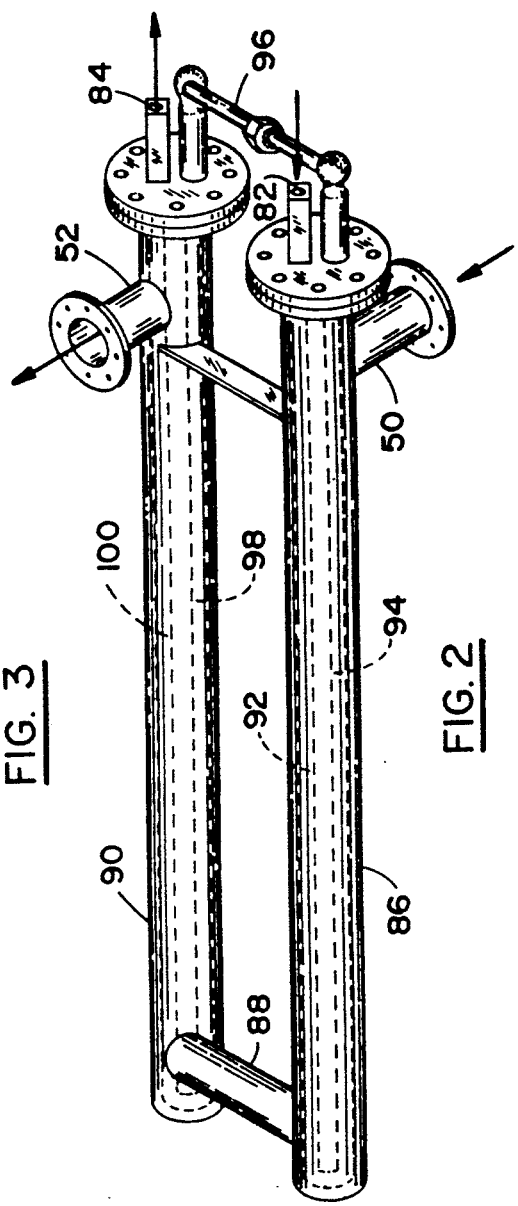
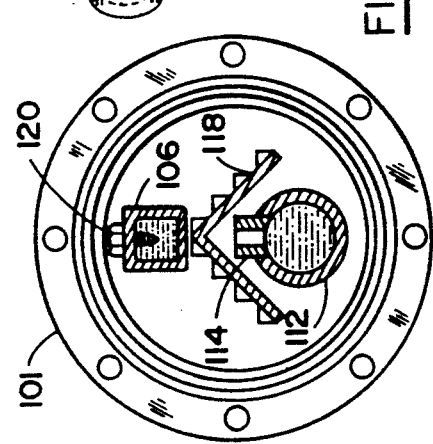

DISTILLATION SYSTEM FOR RECOVERY OF INDUSTRIAL PROCESS LIQUIDS

BACKGROUND OF THE INVENTION

The present invention relates to distillation systems primarily directed to recovery of industrial oils, and the like. More specifically, the invention relates to improvements in distillation systems wherein liquids used in an industrial process are passed through a heater, a still and condenser to recover the more volatile components for re-use in the process.

In manufacturing processes, such as metal rolling mills, a cooling and lubricating liquid is continuously flushed across the surface of the workpiece. Liquids commonly used for such purposes include mixtures of various petroleum distillates in desired proportions suited to the particular process. The liquid becomes contaminated during use with dirt and other solids, as well as other liquids or semi-liquids such as lubricating oils and greases used for operating parts of the process machinery. Although solid contaminants are normally removed by filtration, distillation systems are employed to separate the more volatile process liquids from the heavier oils, etc. with which they become mixed.

Conventional distillation systems include a still which receives heated, contaminated liquid from a suitable heat exchanger. The enclosed chamber of the still is maintained at a sub-atmospheric pressure at which the more volatile components of the heated liquid will vaporize, leaving the other components in liquid form within the still, from which they may be discharged to a holding tank or returned to the heater, such liquids being commonly known as "bottoms". Vaporized liquid from the still is passed to a condenser, where it is cooled to return to the liquid state and may then be returned to the process wherein it is used.

It is, of course, desirable to conduct the distillation process at optimum efficiency in terms of volume of recovered process liquid in relation to energy used. The principal object of the present invention is to provide a distillation system of the type outlined above which operates at improved efficiency in relation to prior art systems.

Another object is to provide an industrial oil recovery distillation system wherein process liquids are heated prior to introduction into the still in a manner which enhances system efficiency.

A further object is to provide novel and improved apparatus for effecting vaporization of volatile components of industrial process liquids within a still.

An additional object is to provide a preheater tube assembly which may be easily and economically incorporated in a heater for an industrial oil recovery distillation system.

Yet another object is to provide novel and improved apparatus for effecting vaporization of volatile components of liquid within the still of an industrial oil recovery distillation system.

A still further object is to provide a novel and improved method of operation of a distillation system for recovery of industrial process liquids which enhances efficiency and reliability of operation.

Other objects will in part be obvious and will in part appear hereinafter.

SUMMARY OF THE INVENTION

Conventional components of the distillation system include a feed pump for delivering liquids from a storage tank wherein they are deposited after use in an industrial process, a heater, a still, a condenser, distillate receiver and cooler, air evacuation system and the usual pumps, valves and piping. Incoming process liquid is circulated through appropriate tubing in the condenser where heat exchange occurs to cool and condense the liquids which have been vaporized in the still, while at the same time increasing the temperature of the process liquids. Having been thus preheated in the condenser section of the system, the process liquids are delivered to a tubing assembly forming a part of the present invention and located in the heater section.

In accordance with the usual practise, liquids which are not vaporized in the still are recirculated to the heater section and then back to the still. The liquids pass through a tube bank within the heater equipped with conventional electric resistance heating elements. Instead of being recirculated to the heating section, the less volatile liquids from the still may be discharged to a holding tank.

After passing through the bank of heated tubes the hot liquids pass into the aforementioned tubing assembly which includes a pair of parallel, elongated, outer tubes, having respective inlet and outlet openings at adjacent ends, and connected for mutual communication at the opposite ends. A pair of smaller tubes, preferably of square cross section, are arranged within each of the outer tubes and thus surrounded by the hot bottoms liquids passing therethrough. One of the pair of tubes within the outer tube having the inlet opening provides an inlet for the preheated process liquids from the condenser section. This inner, inlet tube is connected at its opposite end to communicate with the other inner tube within the inlet outer tube. The other inner tube is connected, externally of the two outer tubes, to one of the pair of tubes extending into the outer tube having the outlet opening. The pair of tubes within the outlet outer tube are likewise connected for mutual communication and the second of these inner tubes provides the outlet for the process liquid which has now been heated by the bottoms liquids.

A second aspect of the invention resides in the inlet manifold of the still. The bottoms liquid from the outlet tube of the heater section are circulated to a first, elongated, inlet tube of the manifold extending horizontally across the interior of the still. A plurality of spaced discharge orifices are arranged along the upper side of the first inlet tube. An elongated angle plate is fixedly positioned with its apex at the top (i.e., as an inverted V) above the first still inlet tube to receive on the lower surfaces thereof the hot bottoms liquid from the spaced discharge openings.

The outlet inner tube of the tube assembly in the heater section is connected to deliver heated process liquid to a second inlet tube of the still inlet manifold. This second inlet tube is parallel to the first and positioned directly above the angled plate for discharge of the process liquid through spaced discharge openings in the bottom of the second tube onto the upper surfaces of the angled plate which are preferably embossed to provide greater surface area.

A conventional air evacuation system maintains the pressure within the condenser and still at a desired, sub-atmospheric level, thereby lowering the temperature at which liquids within the still will vaporize. The process liquid which has been preheated in the condenser and heated in the tube assembly of the heater section is further heated by contact with the angled plate within the still. The more volatile components of the process liquid are thus vaporized within the still, together with some of the bottoms liquid, and subsequently recovered as distillate after passing through the condenser section.

The heating of the process liquid in the tube assembly of the heater section, as well as the enhanced vaporization provided by the inlet manifold structure within the still, contribute to the improved efficiency of operation of the system. The foregoing and other features of the invention will be more readily understood and fully appreciated from the following detailed description, taken in conjunction with the accompanying drawings, wherein:

BRIEF DESCRIPTION OF THE DRAWINGS

FIG. 2 is a perspective view of a tubing assembly of the heater section of the system of FIG. 1;

FIG. 3 is a side elevational view, with portions broken away, of the intake manifold assembly of the still section of the system; and FIG. 4 is an end view in section on the line 4—4 of FIG. 3.

DETAILED DESCRIPTION

Figure 1:
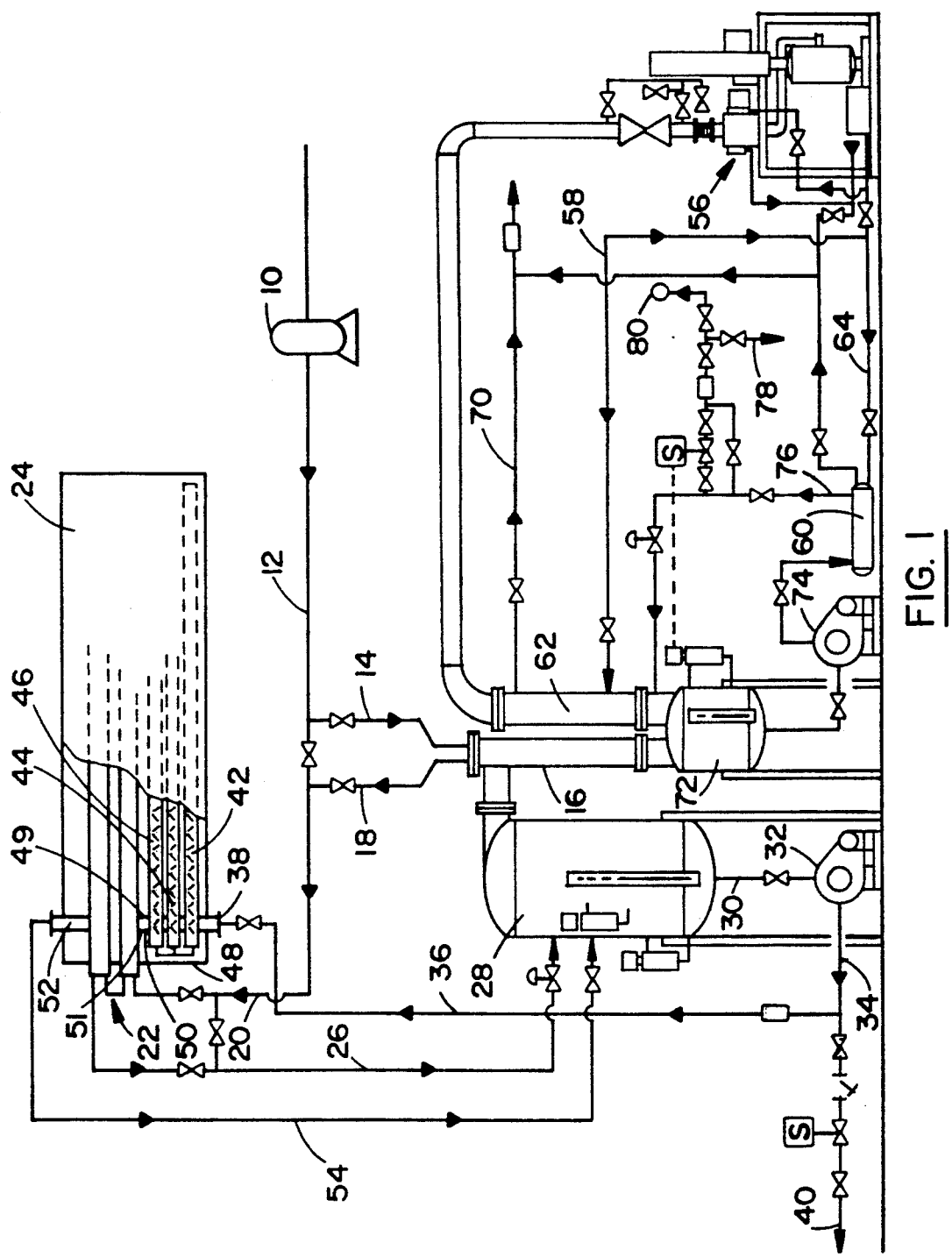
FIG. 1 is a diagrammatic illustration of the overall operation of the distillation system embodying the invention, and interrelationship of components.

Referring now to the drawings, in FIG. 1 is shown a diagrammatic representation of a typical distillation system embodying the present invention. Feed pump 10 delivers liquid from an industrial process, e.g., the liquid used to lubricate and cool the workpiece in an aluminum rolling mill, via lines 12 and 14 to condenser section 16. Process liquid from the supply may pass through an inlet strainer and water stripper (not shown) before reaching feed pump 10. After passing through a tube bank within the condenser section, the process liquid passes through lines 18 and 20 to an inlet of a tube assembly, indicated generally by reference numeral 22 and described later in more detail, of heater section 24. After passing through tube assembly 22, the process liquid is delivered via line 26 to an inlet manifold, also described in detail hereinafter, of still 28.

As the more volatile components of heated liquid delivered to still 28 are vaporized and delivered to condenser 16 via still outlet 29, less volatile components remain in the liquid state within the still. Such liquids are commonly referred to as bottoms liquids, or simply as bottoms. In accordance with conventional operation of such distilling systems, bottoms liquids are removed from still 28 through line 30 and delivered by pump 32 via lines 34 and 36 to bottoms inlet 38 of heater section 24. By either manual or automatic operation of suitable valves, bottoms liquids may be discharged via line 40 to a holding tank for subsequent disposal.

Bottoms liquids entering heater section 24 through inlet 38 pass through a bank of interconnected heating tubes. The tube banks of conventional distillation system heater sections comprise a plurality of parallel pairs of tubes with an inlet at one end of a first of the tubes and outlet at the adjacent end of the second tube, the opposite ends of the two tubes being connected for passage of the liquid from the inlet of the first tube to the outlet of the second which in turn is connected to the inlet of the next tube pair. One tube of each of three pairs of side-by-side tubes is shown in FIG. 1, indicated by reference numerals 42, 44 and 46. An electric heating element is positioned within a sealed enclosure centrally positioned in each of the tubes and extending axially the length thereof, the connections of the heating elements to a suitable electrical power source being indicated schematically by reference numeral 48.

As bottoms liquids pass through the heater tube bank the temperature is raised to a desired level, consistent with the distillation process being performed. The outlet 49 of the last of the heater tubes is connected via tube 50 to the inlet 51 of tube assembly 22. Bottoms liquids are discharged from tube assembly 22 through outlet 52 and pass via line 54 to the aforementioned inlet manifold of still 28. The pressure within the still and condensing section of the system is maintained at a desired subatmospheric level by a conventional vacuum pump section, indicated generally by reference numeral 56, as is the common practise in the operation of such distillation systems.

Water or other coolant to assist in condensation and cooling of recovered distillate enters through line 58 and passes to distillate cooler 60 and vent cooler 62 via lines 64 and 66, respectively, discharging through lines 68 and 70. Recovered liquids from condenser section 16 pass to distillate receiver 72 and are delivered by distillate pump 74 to distillate cooler 60. Distillate passes from cooler 60 via line 76 for selective return to receiver 72 or withdrawal through sampling outlet 78 or clean distillate discharge 80.

Referring now to FIG. 2, tube assembly 22 is seen to include bottoms liquids inlet 50 (which is also the outlet for tube 46, as seen in FIG. 1) and outlet 52, as well as process liquid inlet and outlet 82 and 84, respectively. Heated bottoms liquids entering through inlet 50 circulate through first outer pipe 86, crossover pipe 88 and second outer pipe 90 to outlet 52. Process liquid entering through inlet 82 circulates through the pair of smaller, inner pipes 92 and 94 positioned within and extending axially substantially the full length of outer pipe 86. Liquid from pipe 94 passes through crossover pipe 96, externally of outer pipes 86 and 90, and thence through the pair of inner pipes 98 and 100 within outer pipe 90 to outlet 84. Since pipes 92, 94, 98 and 100 are completely surrounded by bottoms liquid at its highest temperature within pipes 86 and 90, the process liquid, having already been preheated to some extent within the tube bank of condenser section 16, is brought to a temperature which may approach the vaporization temperature of the more volatile fractions at sub-atmospheric pressures. Pipes 92, 94 98 and 100 are preferably of square cross section to maximize surface area and heat transfer.

The aforementioned intake manifold structure is shown in FIGS. 3 and 4, connected to the wall of still 28 by flange structure 101. Process liquid from line 26 enters the manifold through pipe 102 which is connected by transition section 104 to pipe 106, also preferably a square cross section tubing of, for example, double the cross sectional area of the inner pipes of tube assembly 22 and line 26. Bottoms liquids from line 54 enter through pipe 108, connected by reducing section 110 to smaller diameter pipe 112. Pipe 112 is positioned directly below and parallel to pipe 106. A plurality of outlet orifices 114 are evenly spaced along the length of pipe 112 to discharge heated bottoms liquids in an upward direction. Outlet openings 116 in the lower side of pipe 106 permit process liquid to discharge downwardly.

Fixedly positioned between pipes 106 and 112 and extending the lengths thereof is angle plate 118, opposite end portions of which are shown in FIG. 3. Plate 118 is positioned with its apex at the top, i.e., as an inverted V, as best seen in FIG. 4. Bottoms liquid discharged from orifices 114 impinges on the downwardly directed surfaces of plate 118 and imparts heat to the plate. Process liquid passing through openings 116 falls upon the upwardly directed surfaces of plate 118 which are preferably embossed to increase surface area. The decrease in diameter from inlet 108 to discharge pipe 112 provides increased pressure to ensure relatively high discharge velocity for the upwardly directed bottoms liquids impinging on the lower surfaces of plate 118. The reverse is true for the downwardly discharged process liquid from pipe 106, which has a larger cross section than inlet 102. Openings 116 and other interior portions of pipe 106 may be cleaned by access through holes in the top of the pipe, which are closed by self-tapping screws 120.

. Since bottoms liquids are continually recycled through the still and heater section, they contain a greater proportion of less volatile fractions than the process liquid. Thus, the more highly volatile fractions are vaporized as the process liquid contacts the upper surfaces of plate 118, which is heated by contact with the lower surfaces thereof of bottoms liquids from outlet orifices 114. Of course, some of the more volatile fractions of the bottoms liquids, i.e., those which are desireably recovered by the distillation process, are also vaporized as the process continues. The amount of process liquid added to still 28 and the amount of bottoms liquid removed may be automatically controlled by appropriate float valves. Likewise, recovered distillate may be automatically removed without shutdown.

The tube assembly for heating process liquid which is added by the present invention to the otherwise conventional heater section of the system, as well as the unique still intake manifold, provide a more efficient and smoothly operating distillation system for recovery of industrial oils.

What is claimed is:

1. A distillation system for recovery of process liquids used for cooling and lubricating purposes in an industrial process, said system comprising:
   a) a still (28) having an enclosed chamber which is maintained at a sub-atmospheric pressure for vaporization of the more volatile components of heated process and recycled bottoms liquids discharged into said chamber, said still having first (29) and second (30) outlets for said volatile components in vaporized and bottoms in liquid states, respectively;
   b) a condenser (16) for receiving vaporized components from said first outlet and returning said components to the liquid state as recovered distillate;
   c) a heater (24) including a bank of tubes (42, 44, 46) having a first inlet (38) connected for receiving said bottoms liquids from said second outlet, a third outlet 49 communicating with a connecting tube (50), and means for heating bottoms liquids passing through said bank of tubes from said first inlet to said third outlet; and
   d) a tube assembly (22) including at least one elongated outer tube (86, 90) and at least one elongated inner tube (92, 94, 98, 100) positioned within and extending axially of said outer tube, said outer tube having a second inlet 51 connected via said connecting tube to said third outlet for receiving heated bottoms liquids from said bank of tubes, and a fourth outlet (52) connected via a first line (54) to discharge said bottoms liquids into said still, and said inner tube having a third inlet (82) connected for receiving said process liquids from said industrial process and a fifth outlet (84) connected via a second line (26) to discharge said process liquids into said still, whereby said process liquids are heated within said inner tube by heated bottoms liquids in said outer tube prior to discharge into said still.

2. The distillation system of claim 1 and further including a heat exchanger within said condenser section and means for directing said process liquids through said heat exchanger prior to delivery to said third inlet.

3. The distillation system of claim 1 wherein said at least one elongated outer tube comprises first and second elongated outer tubers connected adjacent one end of each for mutual communication, said first outer tube being connected to said second inlet and said second outer tube being connected to said fourth outlet adjacent the respective ends of said outer tubes opposite said one end, and said at least one elongated inner tube comprises a plurality of elongated inner tubes connected for mutual communication and positioned within each of said outer tubes.

4. The distillation system of claim 3 wherein each of said plurality of inner tubes includes a portion extending exteriorly of said outer tubes.

5. The distillation system of claim 4 wherein said exteriorly extending portion of a first of said inner tubes is connected to said third inlet, said first inner tube being connected to a second of said inner tubes within said first outer tube, said exteriorly extending portions of said second and a third of said inner tubes being connected to one another exteriorly of said outer tubes, said third inner tube being connected to a fourth of said inner tubes within said second outer tube, and said exteriorly extending portion of said fourth inner tube is connected to said fifth outlet.

6. The distillation system of claim 1 and further including first 112 and second 106 elongated discharge tubes within said still, said first discharge tube being connected to said first line for discharging into said still bottom liquids from said outer tube of said tube assembly, and said second discharge tube being connected to said second line for discharging into said still process liquids from said inner tube.

7. The distillation system of claim 6 wherein said first and second discharge tubes are positioned within said still to extend substantially parallel to one another with said second discharge tube substantially directly above said first discharge tube.

8. The distillation system of claim 7 and further comprising a plurality of discharge orifices arranged in spaced relation along the upper side of said first discharge tube for upwardly directed discharge of bottoms liquids from said first discharge tube, and a plurality of openings arranged in spaced relation along the lower side of said second discharge tube for downwardly directed discharge of process liquids from said second discharge tube.

9. The distillation system of claim 8 and further including an elongated heat-conducting plate fixedly positioned between and substantially parallel to said first and second discharge tubes with process liquids discharged upwardly from said first discharge tube impinging upon downwardly directed surfaces of said plate, and bottoms liquids discharged downwardly from said second discharge tube impinging upon upwardly directed surfaces of said plate.

10. The distillation system of claim 9 wherein said plate comprises a pair of substantially planar portions connected to one another along a longitudinal edge at an angle, with upwardly directed surfaces of said portions sloping downwardly from said edge.

11. The distillation system of claim 10 wherein said plate is metal and at least said upwardly directed surfaces thereof are embossed.

12. In a distillation system for recovery of contaminated process liquids used in an industrial process, said system including a still (28) to which heated process and bottoms liquids are separately delivered for vaporization of volatile components, a condenser 16 wherein vapors from the still are returned to the liquid state as recovered distillate, a heater to which bottoms liquids from the still are delivered for heating while passing through a tube bank (42, 44, 46) from an inlet to an outlet thereof prior to return to the still, and air evacuation means (56) for maintaining a sub-atmospheric pressure within the still, a preheater tube assembly (22) comprising:

a) at least one elongated, outer tube (86, 90) having an inlet and an outlet;
   b) means (50) for connecting said outer tube inlet to said tube bank outlet for passage of bottom liquids heated in said tube bank into said outer tube;
   c) means (54) for connecting said outer tube outlet to said still for discharge of heated bottoms liquids therein;
   d) at least one elongated, inner tube (92, 94, 98, 100) positioned within said outer tube and having first (82) and second (84) portions extending exteriorly of said outer tube, said first and second portions providing an inlet and an outlet, respectively, for said inner tube;
   e) means (12, 20) for connecting said inner tube inlet to a source of said contaminated process liquids for passage of said process liquids into said inner tube, whereby process liquids in said inner tube are heated by bottoms liquids in said outer tube; and
   f) means (26) for connecting said inner tube outlet to said still for discharge of heated process liquids therein.

13. The tube assembly of claim 12 wherein said at least one elongated outer tube includes a pair of elongated, parallel outer tubes having adjacent first and second ends, said outer tube inlet and outlet being located substantially at said first ends of respective ones of said outer tubes, said second ends of said outer tubes being connected for mutual communication of said pair of outer tubes.

14. The tube assembly of claim 13 wherein said at least one elongated inner tube comprises a first pair of elongated, parallel inner tubes arranged within and extending substantially the full length of one of said outer tubes, and a second pair of elongated, parallel inner tubes arranged within and extending substantially the full length of the other of said outer tubes.

15. The tube assembly of claim 14 wherein said first pair of inner tubes each include portions extending exteriorly of the same end of said one outer tube, and said second pair of inner tubes each include portions extending exteriorly of the same end of said other outer tube, adjacent said same end of said one outer tube, said exteriorly extending portion of one of said first pair of inner tubes being connected for mutual communication to said exteriorly extending portion on one of said second pair of inner tubes.

* * * * *